United States Patent

Siol et al.

[11] Patent Number: 5,349,025
[45] Date of Patent: * Sep. 20, 1994

[54] HEAT SEALABLE PLASTIC FILM

[75] Inventors: Werner Siol, Darmstadt-Eberstadt; Ulrich Terbrack, Reinheim, both of Fed. Rep. of Germany

[73] Assignee: Rohm GmbH Chemische Fabrik, Darmstadt, Fed. Rep. of Germany

[ * ] Notice: The portion of the term of this patent subsequent to Sep. 6, 2011 has been disclaimed.

[21] Appl. No.: 992,097

[22] Filed: Dec. 17, 1992

[30] Foreign Application Priority Data

Dec. 21, 1991 [DE] Fed. Rep. of Germany ....... 4142691

[51] Int. Cl.$^5$ ................. C08F 255/02; C08F 265/06; C08F 279/02; C08F 283/12
[52] U.S. Cl. .................... 525/309; 525/297; 525/310; 525/479; 428/35.7; 428/515
[58] Field of Search ............. 525/309, 297, 310, 479

[56] References Cited

U.S. PATENT DOCUMENTS

| | | | |
|---|---|---|---|
| 3,645,838 | 2/1972 | Newman, Jr. et al. | |
| 4,291,090 | 9/1981 | Kenji et al. | 428/327 |
| 4,513,118 | 4/1985 | Suetterlin et al. | |
| 4,542,171 | 9/1985 | Elser et al. | 525/307 |
| 5,178,293 | 1/1993 | Suzuki et al. | 220/359 |

FOREIGN PATENT DOCUMENTS

| | | |
|---|---|---|
| 0254417 | 1/1988 | European Pat. Off. . |
| 0321878 | 6/1989 | European Pat. Off. . |
| 0381029 | 8/1990 | European Pat. Off. . |
| 0406681A2 | 1/1991 | European Pat. Off. . |
| 2418949 | 11/1974 | Fed. Rep. of Germany . |
| 3531036 | 3/1987 | Fed. Rep. of Germany . |
| 1354907 | 5/1974 | United Kingdom . |

OTHER PUBLICATIONS

Derwent Abstract of DE-A 3,531,036.

Primary Examiner—Vasu S. Jagannathan
Attorney, Agent, or Firm—Oblon, Spivak, McClelland, Maier & Neustadt

[57] ABSTRACT

This invention relates to heat-sealable plastic films PF with at least two-phased structure in the thickness range up to 400 μm that are suitable for tightly sealing plastic comprising a) a high molecular weight or crosslinked polymer P with a molecular weight Mw greater than 50,000 and a glass transition temperature Tg below 10° C.; and
b) a copolymer CP with a glass transition temperature Tg above 20° C. made up of
   α) 0-85 wt. % methyl methacrylate
   β) 0-100 wt. % ethyl methacrylate
   γ) 0-100 wt. cyclohexyl methacrylate, cyclopentyl methacrylate, or a mixture thereof;
   δ) 0-20 wt. % of a monomer copolymerizable with the monomers α)-γ), and different from them, provided that the sum of the components α) to δ) is 100 wt. % wherein at least 2 wt. % of copolymer CP is covalently bound to polymer P.

8 Claims, 1 Drawing Sheet

T: IMPACT-RESISTANT BASE
S: SMOOTHLY FLOWING SEALING LAYER

HEAT SEALABLE PLASTIC FILM

BACKGROUND OF THE INVENTION

1. Field of the Invention

This invention relates to a heat-sealable plastic film with at least a two-phased structure in the thickness range up to 400 μm, that is especially suitable for the tight sealing of plastic containers, for example those made of polystyrene. The plastic film is particularly suitable for sealing containers for storing foods, such as yogurt cups, for example.

2. Discussion of the Background

Instead of pots and containers made of wood or of inorganic materials such as metal, glass, or ceramic, plastic products have frequently become popular in recent times. The criteria are particularly high when the pots or containers are used to hold and preserve foods.

A critical aspect of food preservation, whether by dehydration, freezing, or sterilization, is complete prevention of microbial growth. This often makes it necessary to seal the containers gas-tight. With plastic containers, furthermore, it is necessary to consider mechanical strength, control of water content, and the effect of the atmosphere and of light (cf. Ullmann's Encyclopedia of Industrial Chemistry 5th Ed. Vol. All, 523–560; 583–618 VCH 1988; the applicable standards were also discussed there).

Aluminum covers coated with a sealing lacquer are widely used to seal plastic containers in food technology, especially for dairy products such as yogurt cups.

Such aluminum covers frequently represent a three-layered laminate whose outer layer frequently consists of (biaxially oriented) polyethylene terephthalate (O-PET), biaxially oriented polypropylene (OPP), polyamide (O-PA), or cellulose. The heat-sealable inner layer, on the other hand, usually consists of polyethylene, ethylene copolymers, or polypropylene (U.S. Pat. No. 4,753,708; G. Stehle, Neue Verpackung September 1991, pp. 94–101). However, economic and ecological factors are being brought into the discussion more and more against the use of aluminum, for example, for packaging foods, especially considering the high cost of energy in the production of aluminum.

Therefore, plastic films provided with a sealable lacquer are also coming into use instead of aluminum. The sealing lacquer matches the plastic used. Hard polyvinyl chloride (hereinafter PVC) plays a very substantial role as a relatively economical material for sealable films with good mechanical strength and good barrier characteristics, with an acrylic resin ordinarily being used as the sealing lacquer film, whose adhesive strength and melting point can be suitably modified by additives.

However the use of PVC is subject to certain objections (cf. Ullmann's Encyclopedia loc. cit. p. 593). There is therefore a trend today to replace PVC by other thermoplastic materials for disposable packages.

Plastic films produced by coextrusion are described in DE-A 3,531,036; they consist of a sealable layer of high impact strength polystyrene, a block copolymer, and a lubricant.

In EP-A 0 406,681, the problems of using heat-sealable plastic films instead of aluminum foil are properly pointed out. The substantially tighter restrictions on processing are usually conspicuous limitations. A very narrow processing range of 10°–20° C., which has to be held rather constant to guarantee problem-free production and satisfactory use of the sealed package, is found in most cases. This prerequisite is not always met in filling systems with several cavities for the simultaneous filling of cups.

EP-A 0 406,681 undertook the task of improving the films based on polystyrene and others that can be produced by the coextrusion process according to DE-A 3,531,036 so that the processing range and processing reliability are increased.

Satisfactory production was also said to be provided, even on filling systems with several filling cavities. In practice, this amounts to the use of higher sealing temperatures with corresponding specifications for the quality of the plastic films.

According to EP-A 0 406,681, these specifications were satisfied by a sealable plastic film produced by the coextrusion process or by lamination from two layers A and C and optionally a layer B, as well as optionally one layer each of an adhesion promoter D for joining each of the layers A, and optionally B and C, consisting of 1 to 50% of a layer of a heat-sealable, high impact strength polystyrene A, up to 95% of a support base B, and 1 to 99% of a high-melting plastic layer C, with the sum of the thicknesses or of the weight of A and optionally B and C being 100% in each case.

While polystyrene can be said to be desirable as a packaging material from the point of view of manufacturing cost and forming conditions (110°–160° C.), its relatively high permeability to gases and vapors can lead to problems. The difficulties caused by adhesion to the sealing heads can actually be overcome by the layered structure of the sealing film based on high impact styrene polystyrene, but this is accomplished with increased expense in production and sometimes with disposal problems.

Therefore, there still existed a need for a heat-sealable film material. In particular, the film should be suitable, if possible as a homogeneous film and without additional surface treatment, for the gas-tight sealing of containers based on polystyrene.

Above all, however, the film material should be environmentally friendly, i.e., the film material should be recyclable even when constructed of several layers.

It has now been found that the heat-sealable plastic films PF pursuant to the invention, although they belong to another class of polymers, meet the requirements of technology with regard to mechanical stability, chemical behavior, barrier properties, thermal properties, processability (see Ullmann's Encyclopedia Vol., All, loc. cit.) and recyclability, to a very great extent.

SUMMARY OF THE INVENTION

Accordingly, one object of this invention is to provide a novel heat-sealable plastic film PF with at least a two-stage construction.

A second object of the invention is to provide for a novel at least two-layered heat-sealable plastic film.

A third object of the invention is to provide for a novel plastic bond formed by a heat-sealable plastic film.

A fourth object of the invention is to provide for a novel polystyrene container sealed with a heat-sealable plastic film.

The object of this invention is provided for by a heat-sealable plastic film PF with at least a two-phased structure, and a thickness ranging up to 400 μm, which is suitable for tightly sealing plastic containers, especially those made of polystyrene, with the plastic film PF comprising

- a) a high molecular weight or crosslinked polymer P with a molecular weight Mw greater than 50,000, preferably greater than 100,000, and a glass transition temperature Tg below 10° C., preferably below 0° C. and
- b) a copolymer CP with a glass transition temperature Tg above 20° C. comprising
  - α) 0–85 wt. % methyl methacrylate
  - β) 0–100 wt. % ethyl methacrylate
  - γ) 0–100 wt. % cyclohexyl methacrylate, cyclopentyl methacrylate, or a mixture thereof
  - δ) 0–20 wt. % preferably 0–10 wt. % of a monomer different from the monomers α)-γ), copolymerizable with the monomers α) to γ), provided that the sum of the components α) to δ) in b) amounts to 100 wt. %.

wherein at least 2 wt. % of copolymer CP is covalently bound to polymer P.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein.

T: High impact strength carrier layer

S: Readily flowing sealing layer

DETAILED DESCRIPTION OF THE PREFERRED EMBODIMENTS

Figure 1:
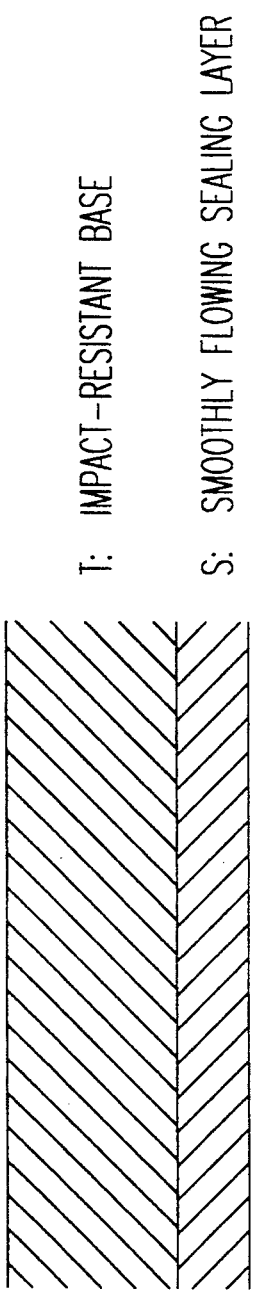
FIG. 1: Structure of a two-layer heat-sealable plastic film PF

The definition stated for the polymer P includes known elastomers (cf. Roempp, Chemie Lexikon, 9th Edition, Vol. 2, pp. 1105–1107, Georg-Thieme-Verlag).

The polymers P are preferably selected from the group consisting of polyolefins, polydienes, polyacrylates, ethylene-vinyl acetate copolymers, polyvinyl esters, and polysiloxanes ( cf. U.S. Pat. No. 4,906,699; Ullmann's Enzyklopädie der Techn. Chemie, 4th Edition, Vol. 13, 595–635, Verlag Chemie 1977).

The form of the embodiment of the heat-sealable plastic film PF in which the polymers are obtained by graft polymerization is of particular interest. Implementation in the form of a core-shell polymer, with the polymers P being assigned to the core material, should be mentioned in particular.

The Polymers P

The high molecular weight or crosslinked polymers P by definition have a molecular weight Mw greater than 50,000, preferably greater than 100,000, especially in the range above 200,000, and if not crosslinked, up to about 5 million, and a glass transition temperature Tg below 10° C. The molecular weight is determined if practical by gel permeation chromatography (hereinafter gpc). (cf. H. F. Mark et al., Encyclopedia of Polymer Science & Engineering, 2nd Ed., Vol. 10, pp. 1–19, J. Wiley 1987; Ullmann's Encyclopädia der Techn. Chemie, 4th Edition, Vol. 15, 207–209, Verlag Chemie 1978). The values of the glass temperatures and their determination can be found in the Polymer Handbook, Ed. J. Brandrup, L. H. Immergut, 3rd Ed. VI, 209 John Wiley 1989, and H. F. Mark et al., Encyclopedia of Polymer Science & Engineering 2nd Ed., Vol. 7, pp. 531–43, J. Wiley 1989.

By definition, the polymers P have a glass transition temperature $Tg < 10°$ C., preferably $<0°$ C., particularly $< -10°$ C., which includes polymers that are ordinarily combined under the term "elastomers" or "rubber". The polymers are optionally crosslinked. The polymers P are preferably selected from the group consisting of polyolefins, polydienes, polyacrylates, ethylene-vinyl acetate copolymers, and polysiloxanes.

The polyolefins are preferably homopolymers or copolymers of ethylene, propylene, or isobutylene (cf. Ullmann's Encyclopädie der Techn. Chemie, 4th Edition, Vol. 19, pp. 167–226, Verlag Chemie 1980). The molecular weight Mw of the polyolefins is usually in the range of 50,000 to 1,000,000 (determined by gel permeation chromatography).

The polydienes in particular are the appropriate known types of rubber such as polybutadienes, poly-2-chlorobutadiene, polyisoprene (cf. Ullmann's loc. cit., 4th Edition, Vol. 13, pp. 595–635). The molecular weight is usually in the range of 50,000 to 1,000,000 (as determined by gpc). Ethylene-vinyl acetate copolymers can vary in composition within certain limits. As a rule, the vinyl acetate content is in the range of 40–75%, preferably 40–50%. The molecular weights are usually in the range of 100,000 to 400,000 (as determined by gpc). They are advantageously made by solution polymerization with average ethylene pressure of 200–400 bar, particularly in t-butanol as solvent. These molecular weight data for the types of rubber generally refer to the molecular weight of the polymers as used for grafting according to b) (i.e. before grafting). In a preferred embodiment, however, these elastomers are crosslinked after grafting with b). It is preferred, in that case, for the elastomers to be in particulate form, with the diameter of these rubber particles generally being in the range of 0.05–10 μm, and with particles in the range of 0.2–5 μm being especially preferred. Such rubber particles that have hardness phase inclusions (cf. Ullmann loc. cit., Vol. 13, p. 623) are especially advantageous.

Also of particular interest as polymers P are ethylene-propylene-diene polymers (EPDM, cf. Ullmann loc. cit., Vol. 13, pp. 619–621; Kirk-Othmer, Encyclopedia of Industrial Chemistry, 3rd Ed., Vol. 8, pp. 492–500, Vol. 7, p. 687, 693, J. Wiley; for preparation, refer to S. Cesca, J. Polym. Sci., Macromol., Rev. 10, 1 (1975)). Particularly recommended as diene components are dicyclopentadiene, ethylidenenorbornene, and trans-1,4-hexadiene.

The molecular weights Mw of the (industrially produced) EPDM polymers are generally in the range of 200,000 to 500,000 (as determined by gpc). The dynamic freezing points are stated to be $-45°$ C. to $-30°$ C. (sequential types). With an ethylene content of 45–60 wt. %, the terpolymers are completely amorphous. Products with an ethylene content of 70–80% can be expected to have partially crystalline ethylene sequences with an average of 5–10 successive ethylene units (so-called sequential types).

Besides EPDM polymers, EPTM polymers (ethylene-propylene-triene) can also be used. Polysiloxanes (MQ, MPQ, MPVQ, according to ISO 1629, 1st Edition 1976) should also be mentioned. The customary silicone rubbers usually have a polydimethylsiloxane chain modified by specific substituents (cf. Ullmann loc. cit., Vol. 13, 628–663).

The types that crosslink at room temperature are polysiloxanes with terminal functional groups with molecular weights of $10^4$–$10^5$ (as determined by gpc). The heat-vulcanizing types, mostly based on polydimethylsiloxane (MQ), can be crosslinked with rapidly decomposing diaryl peroxides at elevated temperature, for example at 150° C. One of the advantages of the plastic material pursuant to the invention that may be mentioned is that polymers P known for themselves, particularly commercial polymers, can be used in component B).

Polyacrylates to be used pursuant to the invention should be understood particularly to be those whose monomer units provide the resultant homopolymers or copolymers with a glass transition temperature Tg of <10° C., preferably <−10° C., and with special preference <−30° C. The glass temperature Tg of the homopolymers or copolymers is known or can be determined by a known method (cf. H. Vieweg, F. Esser, Kunststoff-Handbuch Vol. IX, pp. 333–339, Carl Hanser Verlag 1975; J. Brandrup, E. H. Immergut, Polymer Handbook, III-144 to III-148, John Wiley 1975, Kirk-Othmer, Encyclopedia of Chemical Technology 3rd Ed., Vol. 1, 388, J. Wiley 1978).

The polyacrylates are preferably prepared by polymerization in aqueous emulsion, sometimes also in suspension. Particularly in the case of polyacrylates as polymer P, preparation of the polymeric material for the plastic film PF by emulsion polymerization is preferred (cf. H. Rauch-Puntigam, Th. Völker, Acryl- und Methacrylverbindungen Springer Verlag, Heidelberg 1967, since plastic materials with a definite particle structure can be produced by this method particularly easily. Thus, it in especially preferred to construct latex particles with an outer shell of the copolymer CP that contain a rubber of crosslinked polyacrylate P in their interior. Particularly preferred in this case are latex particles with at least a three-stage structure, or particles that also have a hard polymeric core in the polyacrylate P. Overall, these polyacrylate particles P (with incorporated hard core) should have a diameter of 0.1–3 (preferably 0.2–1) μm. In principle, the construction of such latex particles and the isolation of the polymer solid are described in German Patent Application P 3,300,256 and U.S. Pat. No. 4,513,118, and U.S. Pat. No. 4,997,883.

It is suitable in emulsion polymerization to operate in the neutral or slightly acidic pH range, with the use of long-chain alkylsulfates or alkylsulfonates as emulsifiers being desirable.

Suitable initiators are the appropriate known azo compounds and organic or inorganic peroxides such as potassium persulfate, or redox systems such as persulfate/bisulfite, for example. In general, the initiator content is in the range of 0.001 to 1 wt. % based on the monomers. For the purpose of suspension polymerization, nonionic, water-soluble dispersion stabilizers are used primarily, and organic peroxides or azo compounds that are soluble in the monomers are used as initiators. (Cf. H. Rauch-Puntigam, Th. Völker, Acryl- und Methacrylverbindungen loc. cit. These acrylate elastomers usually also contain crosslinking monomers (for example, allyl methacrylate) in proportions of 0.1 to 5 wt. %.

Core-shell polymers with (crosslinked) polybutadiene or (crosslinked) polyvinyl esters as core material, for example, besides those with polyacrylates, can also be obtained by the two-step emulsion polymerization procedure described above. The three-step construction described above with a "hard" core can also be accomplished by emulsion polymerization starting with PMMA or polystyrene, with the intermediate zone preferably being made up of an elastomer such as polyacrylate (crosslinked), polyvinyl ester (crosslinked), polybutadiene, and with the shell being made up of the polymeric material CP.

The Copolymers CP

The fractions of the monomers $\alpha$), $\beta$), $\gamma$), and $\delta$) in the copolymer CP add up in each case to 100 wt. %. The monomers $\delta$) different from $\alpha$), $\beta$), and $\gamma$), which are copolymerized in proportions of 0–20 wt. %, preferably in the range of 0–10 wt. % and with very special preference in the range of about 0.5–5 wt. %, are vinyl monomers that can be copolymerized with $\alpha$), $\beta$), and $\gamma$). Monomers $\delta$) that may be mentioned are esters and amides of methacrylic acid and methacrylic acid itself different from $\alpha$), $\beta$), and $\gamma$), but especially derivatives, and in this case again especially the esters of acrylic acid or styrene and optionally substituted styrenes. The copolymerization of small amounts of acrylic esters is especially preferred, since thermal stability, and therefore processing stability, can thereby be improved; this is important, for example, for processing by extrusion.

As a rule, the monomer $\alpha$), or MMA, is combined with cyclopentyl methacrylate or preferably with cyclohexyl methacrylate.

Preferred copolymers CP are made up, for example, of $\alpha$) 10–85 wt. % methyl methacrylate
$\gamma$) 90–15 wt. % cyclohexyl and/or cyclopentyl methacrylate, and
$\delta$) 0–20 wt. % (preferably 0–10 wt. %) monomers different from $\alpha$, $\beta$, and $\gamma$.

Particularly preferred adhesion copolymers CP contain 40–80 wt. % (especially preferred 55–75 wt. %) MMA and 60–20 wt. % (especially preferred 45–25 wt. %) cyclohexyl methacrylate and monomers $\delta$) in proportions of 0–10 wt. %. Also preferred are heat-sealable plastic films whose copolymer component CP is made up of $\beta$) 0–100 wt. % (especially preferred 50–90 wt. % and very especially preferred 65–85 wt. % ethyl methacrylate and
$\gamma$) 0–100 wt. % (especially preferred 10–50 wt. % and very especially preferred 35–15 wt. %) cyclohexyl methacrylate and
$\delta$) 0–20 wt. % (preferably 0–10 wt. %) monomers copolymerizable with $\beta$) and $\gamma$) and different from $\alpha$), $\beta$), and $\gamma$).

The preferred forms of the embodiment mentioned above particularly guarantee outstanding adhesion to polystyrene and problem-free reuse of the sealing film wastes together with the polystyrene, usually high impact strength, to which these heat-sealable plastic films PF have been sealed.

The reason for the good sealability of this film to polystyrene and the problem-free joint reuse of sealing film and substrate can be found precisely in the preferred compatibility with polystyrene. It can be assumed as a rule of thumb that with increasing content of monomers $\gamma$), particularly with increasing content of cyclohexyl methacrylate in the polymer, the compatibility of the copolymer CP and thus of the overall polymer P-CP with polystyrene will increase.

Especially good usable systems can be produced as a rule with the aforementioned combinations MMA/cyclohexyl methacrylate and ethyl methacrylate/cyclohexyl methacrylate. Other monomers, for example alkyl (meth)acrylates with $C_3$–$C_{18}$, alkyl groups, are used as a rule to control the flow properties and thus the ease of the sealing process.

If the polymers P are not linked to the copolymer CP in the form of a block copolymer, for example in the form of a 3-block copolymer CP-P-CP, as a rule the copolymer CP is not 100% bonded covalently to the polymer P. In general, the proportion of the copolymer CP by weight that is bonded covalently to the polymer P is at least 2 wt. %, preferably at least 5 wt. %, and with very special preference at least 10 wt. % (each based on the copolymer CP). This at least partial bonding of the copolymer CP to the polymer P is important for good distribution of the polymer P in CP, but above all, the necessary toughness of the entire system is achieved by this good bonding.

In general, the molecular weight of the copolymer CP not bonded to the polymer P is limited. Thus, the molecular weight of the copolymer CP as a general rule will be in the range of 5,000–200,000, (Mw), preferably in the range 5,000–200,000, and with special preference in the range 10,000–200,000 Daltons (as determined by gpc).

The processability, toughness, sealability, thermal formability, and blocking resistance of the overall systems can be adjusted almost arbitrarily by the following parameters:

Weight ratio P to CP (the plastic films generally contain 5–95, preferably 10–80, with very special preference 20–60 wt. % P and 95–5, preferably 90–20, with very special preference 80–40 wt. % CP)

Linking of P with CP

The particle size of the generally crosslinked polymer P

The molecular weight of the copolymer CP

The glass transition temperature of the copolymer CP

Thus, a material that flows especially readily can be achieved by regulating the molecular weights of the copolymers CP with 0.1–2 wt. % mercaptans as polymerization regulators.

Such regulated material not only flows very easily, but it can also be sealed at relatively low temperature (150°–200° C.) to the appropriate substrate (generally high impact strength polystyrene).

A particularly elegant process for preparing the CP-P graft copolymers (as discussed above) is a multiple-step emulsion polymerization, with a hard core, for example crosslinked PMMA or polystyrene, being polymerized in a first step, a butadiene or an acrylic ester, for example butyl acrylate, being polymerized in a second step as such or with the addition of a crosslinker, and finally an outer shell of the copolymer CP, as discussed, with a portion of the copolymer CP being grafted to the polymer P, and with a portion of the copolymer CP being limited in molecular weight by addition of 0.1–2 wt. % mercaptan, for example dodecyl mercaptan. Generally, such emulsion polymer particles have a diameter of 40–1,000 nm; if three-phase systems are involved, as discussed here, the particle size (diameter) is ordinarily in the range of 200–1,000 nm.

The Heat-Sealable Plastic Films PF

The heat-sealable plastic films PF pursuant to the invention can be made by a known method, for example by extrusion of the polymer material (cf. H. F. Mark et. al., Encyclopedia of Polymer Science & Technology 2nd Ed., Vol. 11, pp. 269–271, J. Wiley 1988; ibid, Vol. 4, 816; Ullmann's Encyclopedia of Industrial Chemistry Vol. All, pp. 85–111, VCH 1988, F. Hensen et al., Handbuch der Kunststoff Extrusionstechnik, Vol. II, Extrusion Systems, C. Hanser Verlag 1986).

By definition, the film thickness is in the range up to 400 μm, preferably in the range 60 to 300 μm, and with special preference in the range of 80–250 μm.

The plastic films PF obtained pursuant to the invention are very readily usable in the context of the problem described at the outset. In particular, they can be heat sealed with no problems to some extent (cf. G. Stehle, Neue Verpackung, loc. cit.), with emphasis on the processing latitude and processing reliability. It must be pointed out that the films PF can be deep-drawn, stamped, and imprinted. They are also distinguished by low permeability to gases such as $O_2$, $CO_2$, etc. They can readily be pigmented by customary methods of plastic pigmentation (cf. Becker-Braun, Kunststoff-Handbuch Vol. 1, 539–540, Hanser 1990).

The films PF also satisfy modern ecological requirements since they are recyclable.

In the context of this problem, the plastic films PF are used with special advantage for sealing plastic containers, especially those made of polystyrene and high impact strength modified styrene. The covers of the plastic containers made of the plastic films PF pursuant to the invention and sealed in place meet the requirements mentioned at the outset for mechanical and chemical stability, thermal properties, and processability, to an outstanding degree. Although they are made up of only a single-layered material, their adhesion, for example to polystyrene and modified polystyrene, is excellent with no significant problems from adhesion to sealing heads.

The bond between a film PF pursuant to the invention and containers that are made up entirely or partly of polystyrene, for example yogurt cups, should be mentioned as an example. A bond can also be made with no problems with containers that have the same composition as the plastic film PF itself.

Plastic films PF pursuant to the invention that have at least a two-layered structure (cf. FIG. 1) are very especially suitable for sealing cups and bowls. In FIG. 1, the reference symbol T stands for a layer of a carrier material made of tough, relatively low-flowing material P-CP, and the reference symbol S stands for a sealing layer of a very readily flowing material P-CP, or of the copolymer CP alone. The layer T generally has a thickness in the range of 50–398 μm, particularly 60–250 μm, and the thickness of the sealing layer S is generally 2–60 μm, particularly 5–30 μm.

Such composite films can be made by coextrusion of a very readily flowing formulation P-CP, for example with strictly regulated molecular weight of the CP or with only a low P content, on a carrier material P-CP with higher molecular weight and higher proportion of P.

In the same way, the sealing layer S can be applied by coating onto the carrier material T. In any case, this two-layered structure of the film PF offers the advantage that the sealing conditions (for example the temperature of the sealing lacquer or the pressure) can be varied within wide limits without fear of the film sticking to the hot sealing heads.

This two-layered film can also be adjusted so that the stamping wastes or other film residues can be used in their entirety for making a new carrier film T, with the necessity only of using fresh material for the sealing layer S since T and S are arbitrarily miscible.

Beneficial Effects

The plastic films PF pursuant to the invention (or the molding compositions underlying these films) offer the following advantages, among others, as shown by the example or the sealing of polystyrene cups:

- The films can be sealed directly to polystyrene.
- The films can be sealed on the conventional systems used for heat sealing (for example, sealing pressure <2 bar, sealing time: 0.1–2 sec, sealing temperature approx. 180°–220° C.).
- The films show no adhesion at all to the hot sealing head. This can be attributed especially to the very good adhesion of the films to the polystyrene. This is particularly true of two-layered plastic films PF.
- The films can be stamped readily.
- Waste formed during stamping can be processed into new films.
- The films can be imprinted.
- The films can be adjusted to be very tough, so that the packages are resistant and can be stacked readily.
- Depending on the application, the films can be used glass-clear (to recognize the contents easily), or opaque. A light barrier is important, for example, for products containing fat.
- The good barrier effect of the films to be viewed as polymethacrylates in this property (polymethacrylates have a permeation coefficient for oxygen and $CO_2$ about 100 times lower than that of polystyrene) on the one hand permits smaller film thicknesses, and on the other hand makes better protection of the packaged product possible.
- The polymethacrylate of the cover film and the polystyrene of the container are completely compatible, so that joint recycling of container and cover is possible. This applies both to one-layered and to multiple-layered plastic films PF.

Having generally described this invention, a further understanding can be obtained by reference to certain specific examples which are provided herein for purposes of illustration only and are not intended to be limiting unless otherwise specified.

EXAMPLE 1 a) Preparation of Dispersion

Two-step emulsion polymer with 50% core, 50% shell, solids content 40%.

Core:
198 g butyl acrylate, 2 g allyl methacrylate, batch polymerization 50°–80° C.

Shell:
140 g ethyl methacrylate, 60 g cyclohexyl methacrylate

Infeed polymerization at 80° C. in one hour, 2nd half of the shell regulated with 1% dodecyl mercaptan.

b) Preparation of Film

Dry the dispersion at 80° C. alternatively: Press the solid obtained by freeze coagulation, or extrude.

c) Sealing Polystyrene Cups

A film cover is stamped out of the glass-clear two-phase polymethacrylate film (from b). The film cover is sealed to a polystyrene cup in a heat-seal press:
Temperature: 185° C.
Pressure: 0.8 bar
Time: 0.6 sec A properly sealed polystyrene cup is obtained with a glass-clear polymethacrylate cover that adheres properly. The film material shows no adhesion at all to the hot sealing head.

d) Recycling

Film material (cover) and high impact strength polystyrene (cup) are kneaded together in a measuring kneader (Haake Rheodrive 5000). A homogeneous melt with good flow properties is obtained, from which new cups can be injection molded.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heat-sealable plastic film PF with at least a two-phased structure in the thickness range up to 400 μm that is suitable for the tight sealing of plastic containers, comprising
   a) a high molecular weight or crosslinked polymer P with a molecular weight Mw greater than 50,000 and a glass transition temperature Tg below 10° C.; and
   b) a copolymer CP with a glass transition temperature Tg above 20° C. comprising
      α) 0–85 wt. % methyl methacrylate
      β) 0–100 wt. % ethyl methacrylate
      γ) 0–100 wt. % cyclohexyl methacrylate, cyclopentyl methacrylate, or a mixture thereof; and
      δ) 0–20 wt. % of a monomer copolymerizable with the monomer α) to γ) wherein the sum of monomers α), β), γ) and δ) is 100 wt. %.
   wherein at least 2 wt. % of copolymer CP is covalently bound to polymer P.

2. The heat-sealable plastic film PF of claim 1, wherein said copolymer CP comprises
   α) 10–85 wt. % methyl methacrylate;
   γ) 90–15 wt. % cyclohexyl methacrylate, cyclopentyl methacrylate or a mixture thereof; and δ) 0–20 wt. % of a monomer different from the monomers α) and γ) but copolymerizable with them.

3. The heat-sealable plastic film of claim 1, wherein said copolymer CP comprises
   β) 0–100 wt. % ethyl methacrylate;
   γ) 0–100 wt. % cyclohexyl, methacrylate, cyclopentyl methacrylate or a mixture thereof; and
   δ) 0–20 wt. % of a monomer different from the monomers β) and γ) but copolymerizable with them.

4. The heat-sealable plastic film PF of any one of claims 1–3, wherein said plastic film is made up of a core-shell emulsion polymer prepared by at least a two-step emulsion polymerization, which has a core of optionally crosslinked polybutadiene, polyacrylate, or polyvinyl ester, and a shell of the copolymer CP.

5. The heat-sealable plastic film PF of any one of claims 1–3, wherein the plastic film is made up of an at least three-step emulsion polymer prepared by at least three-step emulsion polymerization, with 1) an inner core, usually crosslinked, consisting of a polyvinyl polymer with Tg>30° C.;
2) a first shell consisting of a vinyl polymer, usually crosslinked, selected from the group consisting of: polybutadiene, polyvinyl ester, and polyacrylate with Tg<−10° C.; and
3) an outer shell of the copolymer CP.

6. The heat-sealable plastic film PF of any one of claims 1-3 wherein the copolymer CP of the outer shell consists of at least 20 wt. % of copolymer CP not bonded to the polymer P, with a molecular weight in the range of 2,000 to 200,000 Daltons.

7. The heat-sealable plastic film PF of claim 1, wherein said film comprises 5-95 wt. % P and 5-95 wt. % CP.

8. The heat-sealable plastic film PF of claim 1, wherin said film comprises 10-80 wt. % P and 20-90 wt. % CP.

* * * * *